United States Patent
Zhang et al.

(10) Patent No.: US 12,067,493 B2
(45) Date of Patent: *Aug. 20, 2024

(54) TRAINING AND CONFIGURATION OF DL STACK TO DETECT ATTEMPTED EXFILTRATION OF SENSITIVE SCREENSHOT-BORNE DATA

(71) Applicant: Netskope, Inc., Santa Clara, CA (US)

(72) Inventors: Yi Zhang, Santa Clara, CA (US);
Xiaolin Wang, San Jose, CA (US);
Siying Yang, Cupertino, CA (US);
Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 17/202,075

(22) Filed: Mar. 15, 2021

(65) Prior Publication Data

US 2021/0383518 A1 Dec. 9, 2021

Related U.S. Application Data

(63) Continuation of application No. 16/891,678, filed on Jun. 3, 2020, now Pat. No. 10,949,961.

(51) Int. Cl.
*G06T 3/4046* (2024.01)
*G06F 18/214* (2023.01)
(Continued)

(52) U.S. Cl.
CPC ........... *G06N 3/084* (2013.01); *G06F 18/214* (2023.01); *G06N 5/046* (2013.01); *G06T 3/4046* (2013.01);
(Continued)

(58) Field of Classification Search
CPC ......... G06T 5/50; G06T 3/4046; G06T 9/002; G06T 2207/20081; G06T 2207/20084;
(Continued)

(56) References Cited

U.S. PATENT DOCUMENTS 8,429,745 B1  4/2013  Casaburi et al.
8,544,060 B1  9/2013  Khetawat
(Continued)

FOREIGN PATENT DOCUMENTS

WO  2005/069823 A2  8/2005
WO  2014/093613 A1  6/2014

OTHER PUBLICATIONS

Cheng et al., "Cloud Security For Dummies, Netskope Special Edition," John Wiley & Sons, Inc. 2015.
(Continued)

*Primary Examiner* — Jose L Couso
(74) *Attorney, Agent, or Firm* — Haynes Beffel & Wolfeld LLP; Ernest J. Beffel, Jr.; Jason Liao

(57) ABSTRACT

Disclosed are methods and systems for detecting screenshot images and protecting against loss of sensitive screenshot-borne data. One disclosed method includes collecting examples of the screenshot images and non-screenshot images and creating labelled ground-truth data for the examples. The method also includes applying re-rendering of at least some of the collected example screenshot images to represent different variations of screenshots that may contain sensitive information, and further includes training a deep learning stack by forward inference and back propagation using labelled ground-truth data for the screenshot images and the examples of the non-screenshot images. The method further includes using results of the back propagation to configure parameters of the trained DL stack for inference from images in production. Also disclosed is
(Continued)

applying a screenshot robot to collect the examples of the screenshot images and non-screenshot images.

20 Claims, 10 Drawing Sheets

(51) Int. Cl.
*G06N 3/084* (2023.01)
*G06N 5/046* (2023.01)
*G06T 5/50* (2006.01)
*G06V 10/44* (2022.01)
*G06V 10/82* (2022.01)
*G06V 30/414* (2022.01)

(52) U.S. Cl.
CPC .............. *G06T 5/50* (2013.01); *G06V 10/454* (2022.01); *G06V 10/82* (2022.01); *G06V 30/414* (2022.01)

(58) Field of Classification Search
CPC .. G06K 9/6256; G06K 9/6232; G06K 9/6267; G06K 9/6218; G06K 9/6262; G06K 7/1482; G06N 3/084; G06N 5/046; G06N 3/0454; G06N 3/02; G06N 3/08–088; G06N 3/0445; G06N 7/00; G06N 20/00; G06V 30/414; G06V 10/454; G06V 10/82; G06V 30/19173; G06V 30/40; G06V 30/18057; H04L 63/105; H04L 63/20; H04L 63/04; G06F 21/554; G06F 21/6245; G06F 21/60; G06F 21/50; G06F 21/55
See application file for complete search history.

(56) References Cited

U.S. PATENT DOCUMENTS

| | | |
|---|---|---|
| 8,844,059 B1 | 9/2014 | Manmohan |
| 8,943,546 B1 | 1/2015 | Khetawat |
| 9,137,131 B1 | 9/2015 | Sarukkai et al. |
| 10,068,071 B2 | 9/2018 | Shaw et al. |
| 10,540,518 B2 | 1/2020 | Ishida et al. |
| 10,757,090 B2 | 8/2020 | Kahol et al. |
| 10,855,671 B2 | 12/2020 | Kahol et al. |
| 10,867,073 B1 | 12/2020 | Yang et al. |
| 10,949,961 B1 | 3/2021 | Narayanaswamy et al. |
| 10,990,856 B1 | 4/2021 | Yang et al. |
| 2008/0189778 A1 | 8/2008 | Rowley |
| 2012/0008786 A1 | 1/2012 | Cronk et al. |
| 2012/0278872 A1 | 11/2012 | Woelfel et al. |
| 2015/0200924 A1 | 7/2015 | Parla et al. |
| 2015/0319156 A1 | 11/2015 | Guccione et al. |
| 2016/0087970 A1 | 3/2016 | Kahol et al. |
| 2016/0246999 A1 | 8/2016 | Pielot |
| 2018/0278647 A1* | 9/2018 | Gabaev .............. H04L 63/1425 |
| 2018/0293400 A1 | 10/2018 | Borup et al. |
| 2019/0019020 A1 | 1/2019 | Flament et al. |
| 2019/0171794 A1 | 6/2019 | Dhruva et al. |
| 2019/0236352 A1 | 8/2019 | Duke et al. |
| 2019/0325276 A1 | 10/2019 | Fu et al. |
| 2019/0347418 A1* | 11/2019 | Strogov .................. G06F 21/44 |
| 2020/0042837 A1* | 2/2020 | Skinner ................ G06F 18/217 |
| 2020/0076842 A1 | 3/2020 | Zhou et al. |
| 2020/0104603 A1 | 4/2020 | Zucker et al. |
| 2020/0125728 A1 | 4/2020 | Savir et al. |
| 2020/0210590 A1* | 7/2020 | Doyle ....................... G06F 8/77 |
| 2020/0210924 A1 | 7/2020 | Ghosh et al. |
| 2021/0117377 A1* | 4/2021 | Savir ........................ G06N 7/01 |
| 2021/0367961 A1* | 11/2021 | Kuppa ................... G06N 5/022 |
| 2022/0066986 A1* | 3/2022 | Savir ........................ G06N 7/01 |
| 2022/0229764 A1* | 7/2022 | Zhai ...................... G06F 18/214 |

OTHER PUBLICATIONS

"The 5 Steps to Cloud Confidence," netSkope, Inc., 2014, 11 pgs.
"Netskope Cloud Confidence Index™," netSkope, Inc., 2015, 4 pgs.
"Netskope Active Cloud DLP," netSkope, Inc., 2015, 4 pgs.
Screen capture of https://www.bitglass.com/blog/how-topatent-a-phishing-attack, dated Oct. 1, 2015.
PTAB Case No. PGR2021-00091, Petition for Post-Grant Review of U.S. Pat. No. 10,855,671, *Netskope, Inc.*, Petitioner, v. *Bitglass, Inc.*, Patent Owner.
PTAB Case No. PGR2021-00092, Petition for Post-Grant Review of U.S. Pat. No. 10,855,671, *Netskope, Inc.*, Petitioner, v. *Bitglass, Inc.*, Patent Owner.
Jill Gemmill et al., Cross-domain authorization for feder-ated virtual organizations using the myVocs collaboration environment, 21 Concurrency & Computation: Prac-Tice and Experience 509 (2008).
PTAB Case No. IPR2021-01045, Petition for Inter Partes Review of U.S. Pat. No. 10,757,090, *Netskope, Inc.*, Petitioner, v. *Bitglass, Inc.*, Patent Owner.
PTAB Case No. IPR2021-01046, Petition for Inter Partes Review of U.S. Pat. No. 10,757,090, *Netskope, Inc.*, Petitioner, v. *Bitglass, Inc.*, Patent Owner.
U.S. Appl. No. 16/891,678—Office Action dated Jul. 27, 2020, 8 pages.
"Convolutional Neural Network", Learn Convolutional Neural Network from basic and its implementation in Keras, Feb. 24, 2019, https://towardsdatascience.com/convolutional-neural-network-cb0883dd6529, pp. 1-15.
"The Netskope Advantage: Three "Must-Have" Requirements for Cloud Access Security Brokers", Jul. 2015, WP-12-2, 4 pages.
"The Netskope Active Platform Enabling Safe Migration to the Cloud", Apr. 2015, DS-1-8, Netskope, Inc., 6 pages.
"Repave the Cloud-Data Breach Collision Course," netSkope, Inc., 2014, 6 pgs.
"Netskope The 15 Critical CASB Use Cases", Netskope, Inc., EB-141-1, 19 pages.
"Netskope Introspection," netSkope, Inc., 2015, 3 pgs.
"Netskope Cloud Confidence Index™," netSkope, Inc., 2015, 2 pgs.
"Data Loss Prevention and Monitoring in the Cloud" by netSkope, Inc., Nov. 2014, 18 pgs.
"Cloud Data Loss Prevention Reference Architecture", Sep. 2015, Netskope, WP-88-1, 2 pages.
U.S. Appl. No. 16/891,698—Notice of Allowance dated Aug. 10, 2020, 8 pages.
U.S. Appl. No. 16/891,698—Supplemental Notice of Allowance dated Aug. 20, 2020, 8 pages.
U.S. Appl. No. 16/891,647—Office Action dated Sep. 18, 2020, 40 pages.
Traore et al., "Deep convolution neural network for image recognition", Oct. 12, 2018, Elsevier B.V, 257-268.
Ma, Minghuang, et al., "Democratizing Production Scale Distributed Deep Learning", Nov. 3, 2018, 12 pages.
Abadi, Martin, et al., "TensorFlow: A system for large scale machine learning", Nov. 2-4, 2016, 21 pages.
U.S. Appl. No. 16/891,678—Notice of Allowance dated Nov. 12, 2020, 16 pages.
U.S. Appl. No. 16/891,647—Response to Office Action dated Sep. 18, 2020, filed Dec. 9, 2020, 11 pages.
U.S. Appl. No. 16/891,647—Notice of Allowance dated Dec. 31, 2020, 13 pages.
U.S. Appl. No. 16/891,647—Notice of Allowance dated Aug. 10, 2020, 8 pages.
U.S. Appl. No. 16/891,647, filed Jun. 3, 2020, Allowed.
U.S. Appl. No. 16/891,698, filed Jun. 3, 2020, U.S. Pat. No. 10,867,073, Dec. 15, 2020, Granted.
U.S. Appl. No. 17/116,862, filed Dec. 9, 2020, Pending.
EP 21177651.3—Extended European Search Report dated Nov. 3, 2021, 8 pages.
Ricardo Batista Da Neves Junior et al., "A Fast Fully Octave Convolutional Neural Network for Document Image Segmentation", Cornell University Library, Apr. 3, 2020. 8 pages.
EP 21177651.3—Response to Extended European Search Report filed Jun. 7, 2022, 8 pages.

(56) References Cited

OTHER PUBLICATIONS

U.S. Appl. No. 16/891,647, filed Jun. 3, 2020, U.S. Pat. No. 10,990,856, Apr. 27, 2021, Granted.
U.S. Appl. No. 17/229,768, filed Apr. 1, 2021, U.S. Pat. No. 11,574,151, Feb. 7, 2023, Granted.
U.S. Appl. No. 16/891,678, filed Jun. 3, 2020, U.S. Pat. No. 10,867,073, Dec. 15, 2020, Granted.
U.S. Appl. No. 17/116,862, filed Mar. 15, 2021, U.S. Pat. No. 11,537,745, Dec. 27, 2022, Granted.
Hurieh Khalajzadeh, et al., "Persian Signature Verification using Convolutional Nueral Networks" International Journal of Engineering Research and Technology (IJERT), vol. 1, Issue 2, Apr. 2012, pp. 7-12.

* cited by examiner

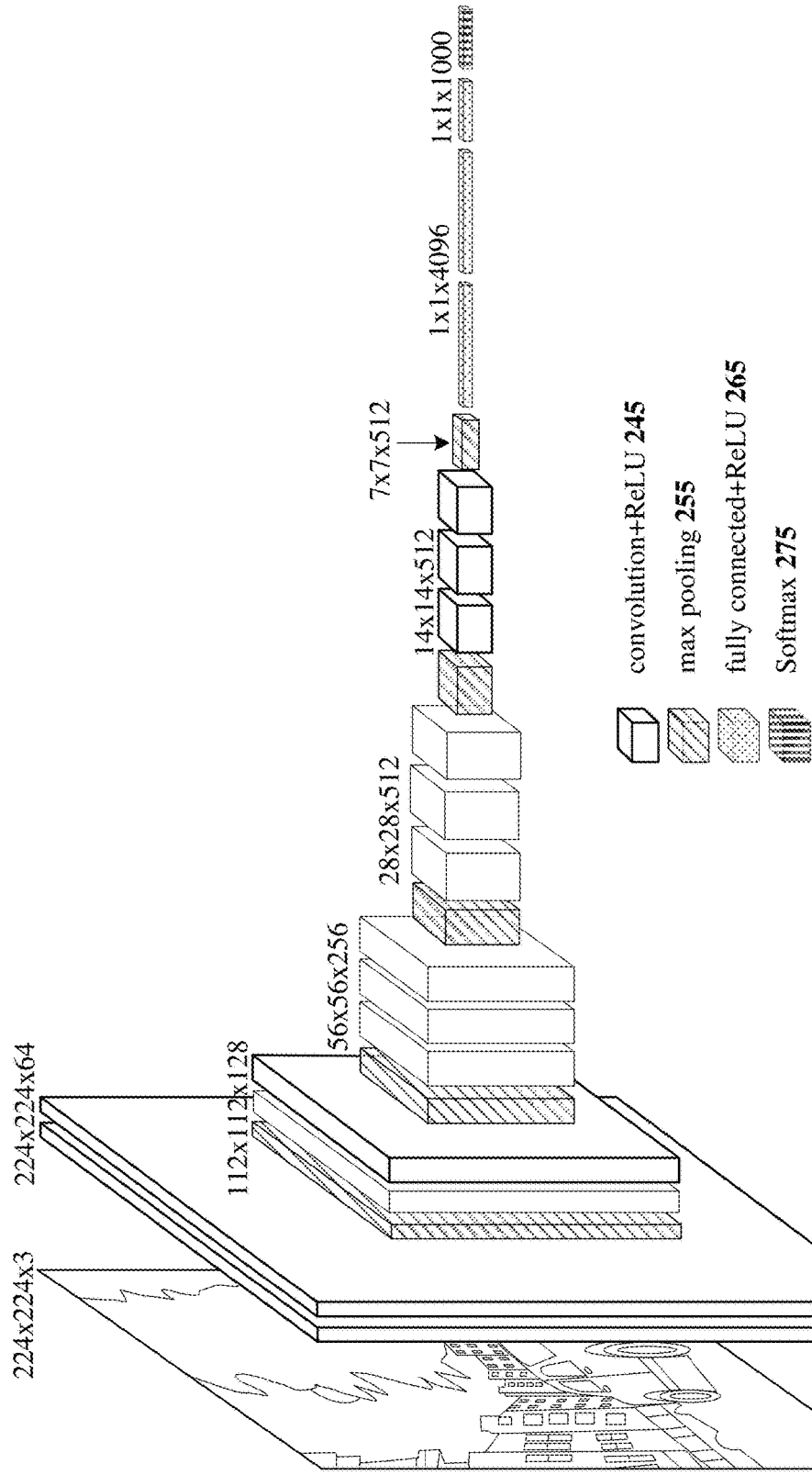
FIG. 2 (Reference)

| | Number of Images | Percentage |
|---|---|---|
| US Driver's License Images in Test | 334 | |
| Detected by OCR+Regex | 238 | 71.2% |
| Detected by Deep Learning Stack | 329 | 98.5% |

WAREHOUSE INVENTORY LIST

TOTAL INVENTORY VALUE: $4,649.00
BIN COUNT: 6
INVENTORY ITEMS: 11

| SKU | Item | Location | Unit | Quantity | Available | Unit Price | Total Value |
|---|---|---|---|---|---|---|---|
| SP7875 | Item 1 | T345 | Each | 20 | 10 | $30.00 | $600.00 |
| TR667880 | Item 2 | T345 | Each | 30 | 15 | $40.00 | $600.00 |
| MK6745054 | Item 3 | T5789 | Each | 10 | 5 | $5.00 | $50.00 |
| TE987R7 | Item 4 | T9876 | Box (10 ct) | 40 | 10 | $15.00 | $600.00 |
| XR234225 | Item 5 | T098 | Each | 12 | 10 | $26.00 | $312.00 |
| PM9876Z4 | Item 6 | T345 | Each | 7 | 10 | $50.00 | $350.00 |
| BM9768A4 | Item 7 | T345 | Each | 10 | 10 | $10.00 | $100.00 |
| BM67655 | Item 8 | T5789 | Each | 9 | 10 | $3.00 | $27.00 |
| WT98788 | Item 9 | T9876 | Package (5 ct) | 20 | 30 | $14.00 | $280.00 |
| TO3456 | Item 10 | T345 | Each | 15 | 6 | $40.00 | $240.00 |
| WE61123 | Item 11 | T345 | Each | 25 | 15 | $8.00 | $200.00 |

FIG. 7

TRAINING AND CONFIGURATION OF DL STACK TO DETECT ATTEMPTED EXFILTRATION OF SENSITIVE SCREENSHOT-BORNE DATA

PRIORITY APPLICATIONS

This application is a continuation of U.S. patent application Ser. No. 16/891,678, entitled "DETECTING SCREENSHOT IMAGES FOR PROTECTING AGAINST LOSS OF SENSITIVE SCREENSHOT-BORNE DATA," filed Jun. 3, 2020, now U.S. Pat. No. 10,949,961, issued 16 Mar. 2021. The priority non-provisional application is hereby incorporated by reference for all purposes.

INCORPORATIONS

The following materials are incorporated by reference in this filing:

U.S. Non-Provisional patent application Ser. No. 16/807,128, entitled "LOAD BALANCING IN A DYNAMIC SCALABLE SERVICES MESH," filed on Mar. 2, 2020.

U.S. Non-Provisional application Ser. No. 14/198,508, entitled "SECURITY FOR NETWORK DELIVERED SERVICES", filed on Mar. 5, 2014 (now U.S. Pat. No. 9,270,765, issued on Feb. 23, 2016), U.S. Non-Provisional application Ser. No. 14/198,499, entitled "SECURITY FOR NETWORK DELIVERED SERVICES", filed on Mar. 5, 2014 (now U.S. Pat. No. 9,398,102, issued on Jul. 19, 2016), U.S. Non-Provisional application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015 (now U.S. Pat. No. 9,928,377, issued on Mar. 27, 2018), U.S. Non-Provisional application Ser. No. 15/368,246, entitled "MIDDLE WARE SECURITY LAYER FOR CLOUD COMPUTING SERVICES", filed on Dec. 2, 2016, which claims the benefit of U.S. Provisional Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016, "Cloud Security for Dummies, Netskope Special Edition" by Cheng, Ithal, Narayanaswamy, and Malmskog, John Wiley & Sons, Inc. 2015, "Netskope Introspection" by Netskope, Inc., "Data Loss Prevention and Monitoring in the Cloud" by Netskope, Inc., "Cloud Data Loss Prevention Reference Architecture" by Netskope, Inc., "The 5 Steps to Cloud Confidence" by Netskope, Inc., "The Netskope Active Platform" by Netskope, Inc.

"The Netskope Advantage: Three "Must-Have" Requirements for Cloud Access Security Brokers" by Netskope, Inc., "The 15 Critical CASB Use Cases" by Netskope, Inc.

"Netskope Active Cloud DLP" by Netskope, Inc.,

"Repave the Cloud-Data Breach Collision Course" by Netskope, Inc.; and

"Netskope Cloud Confidence Index™" by Netskope, Inc. which are incorporated by reference for all purposes as if fully set forth herein.

FIELD OF THE TECHNOLOGY DISCLOSED

The technology disclosed relates generally to security for network delivered services, and in particular relates to detecting identification documents in images, referred to as image-borne identification documents and protecting against loss of the image-borne identification documents while applying security services. The disclosed technology also relates to detecting screenshot images and protecting against loss of screenshot-borne data. Further, distinct organizations can utilize the technology disclosed for detecting image-borne identification documents and for detecting screenshot images from within the organization, so that the organization's images with potentially sensitive data need not be shared to a data loss prevention service provider.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Data loss prevention (DLP) technologies have been widely used in the security industry to prevent leaking of sensitive information such as Personally Identifiable Information (PII), Protected Health Information (PHI), Intellectual Property (IP), etc. Both large enterprises and small-to-medium organizations use DLP products. Such sensitive information exists in different sources, including documents and images. For any DLP products, it is crucial to be able to detect the sensitive information in documents and images with high accuracy and computing efficiency.

For text documents, DLP products use string and regular expression based pattern matching to identify sensitive information. For images, optical character recognition (OCR) technologies have been used to extract text characters first. Then the extracted characters are sent to the same pattern matching process to detect sensitive information. Historically OCR does not perform very well due to its high demand on computation resources and unsatisfactory accuracy, especially when the images are not in the ideal condition, such as when blurred, dirty, rotated or flipped.

While training can be automated, there remains the problem of assembling training data in the right formats and sending data to a central node of computation with sufficient storage and compute power. In many fields, sending personally identifiable, private data to any central authority causes worries about data privacy, including data security, data ownership, privacy protection and proper authorization and use of data.

Deep learning applies multi-layered networks to data. Recently deep learning technologies have been increasingly used in image classification. Deep learning can detect images with sensitive information without going through an expensive OCR process. A significant challenge for the deep learning approach is its need for a large number of high-quality labeled images that represent real-world distribution. In the case of DLP, unfortunately the high-quality labeled images typically utilize real images with sensitive information, such as real passport images and real driver's license images. These data sources by nature are challenging to acquire at scale. This limitation hinders the adoption of deep learning based image classification in DLP products.

An opportunity arises to detect identification documents in images with efficiency and threat detection efficacy improvement of as much as twenty to twenty-five percent, and to protect against loss of sensitive data in the image-borne identification documents Additionally an opportunity is present for detecting screenshot images and protecting against loss of sensitive screenshot-borne data, with a resulting potential consequence of cost and time savings in the security systems utilized by customers who use SaaS.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2 shows a block diagram for a deep learning stack implemented using a convolutional neural network architecture model for image classification configurable for use in a system for detecting identification documents in images and detecting screenshot images, according to one implementation of the disclosed technology.

FIG. 7 illustrates an example screenshot with an inventory list with costs listed.

FIG. 8A shows the Idaho map, which was misclassified as a screenshot due to the legend window and the dotted lines on the top and bottom.

FIG. 8B shows a driver license image which was misclassified as a screenshot because the whole image is a window containing PII in a black background and the UNITED STATES bar may be treated as a header bar.

FIG. 8C shows a passport image, as a major window that contains PII and the shadowed part on the middle bottom may mislead the classifier to think it is an application bar.

FIG. 8D shows a letter in a major window that contains text information and a uniform background.

DETAILED DESCRIPTION

Figure 1A:
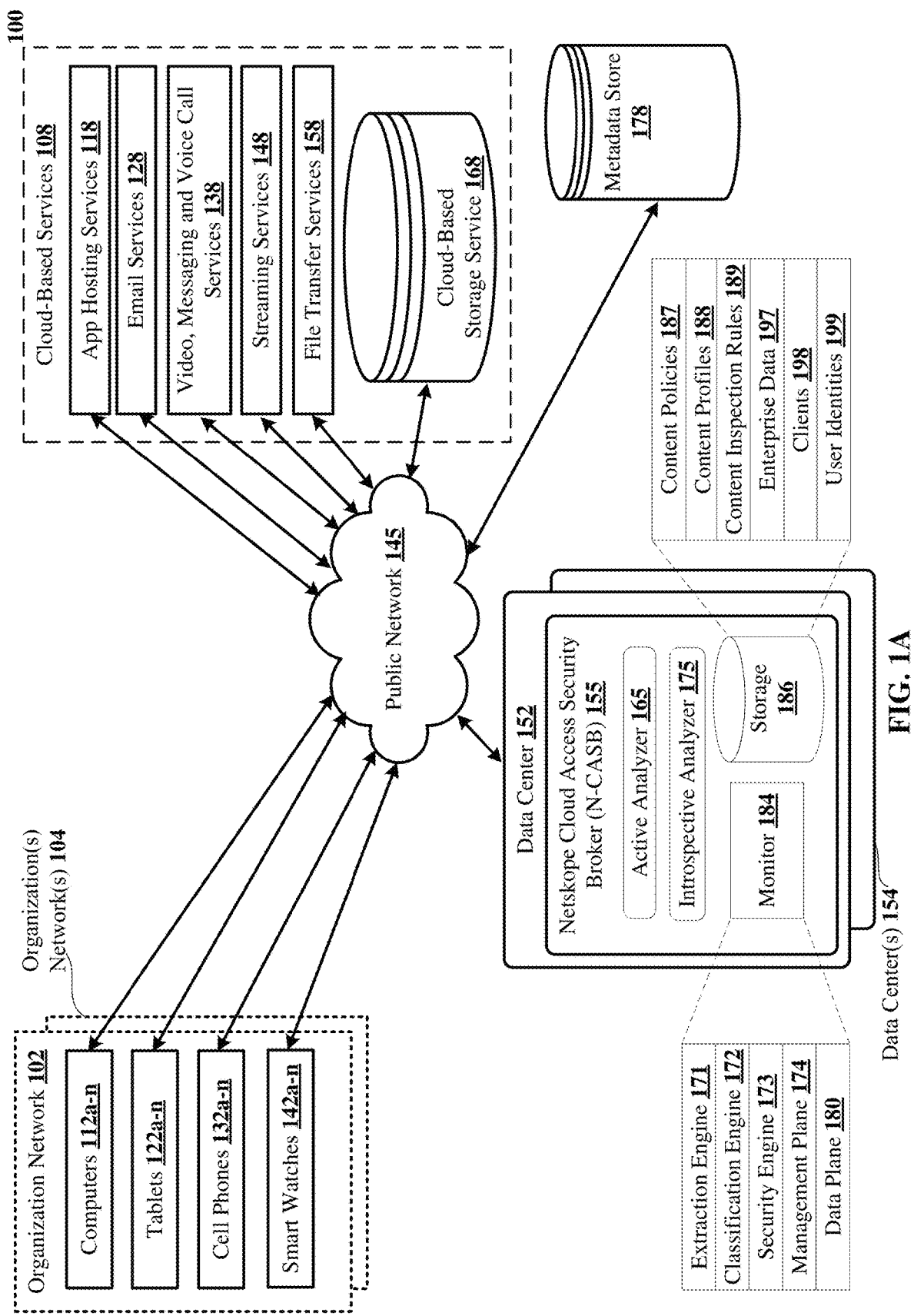
FIG. 1A illustrates an architectural level schematic of a system for detecting identification documents in images, referred to as image-borne identification documents, and protecting against loss of the image-borne identification documents, while applying security services in the cloud. The disclosed system can also detect screenshot images and protect against loss of sensitive screenshot-borne data.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The use of deep learning technologies enhances the detection of sensitive information in documents and images, detecting images with sensitive information without going through existing expensive OCR processes. Deep learning uses optimization to find the optimal parameter values for a model to make the best predictions. Deep learning based image classification typically requires a large number of labeled images with sensitive information, which are challenging to acquire at scale and this limitation hinders the adoption of deep learning based image classification in DLP products.

The disclosed innovations apply deep learning based image classification in data loss prevention (DLP) products, without the upfront need for a large number of labeled images with sensitive information. Many pre-trained generic deep learning models available today use public ImageNet datasets and other similar sources. These deep learning models are typically multi-layered convolutional neural networks (CNN) which have the capability of classifying general objects such as cats, dogs, cars, etc. The disclosed technology uses a small number of specialized labeled images, such as passports and drivers' license images, to re-train the last few layers of the CNN models. This way, the deep learning (DL) stack can detect these specific images with high accuracy, without requiring a large number of labeled images that contain sensitive data.

DLP products in customer deployment process the customer's production traffic and can generate new labels continuously. To minimize privacy issues, new labels can be kept within the production environment, with online learning, and whenever enough batches of new labels accumulate, a similar number of negative images can be injected to create a new balanced incremental data set, that can be utilized to incrementally refine existing deep learning models, with progressive learning.

Even with online learning and progressive learning, the typical deep learning process requires input of the original images and newly added images to create a refined model for predicting the presence of sensitive data in an image document or in a screenshot. This implies that the system needs to save the production-generated new labeled images in production long-term. Within a production environment users' private data is safer than when images and labels are saved offline, however storing the images still triggers privacy concerns if the sensitive data is saved in permanent storage.

The disclosed methods save the output of the deep learning stack, also referred to as the neural network, storing extracted features, instead of the raw images. In popular neural networks, raw images go through many layers before the final set of features are extracted for the final classifier. These features cannot be inverted to the original raw images. This feature of the disclosed technology enables the protection of sensitive information in production images, and the saved features of the model are usable for re-training the classifier in the future.

The disclosed innovations utilize machine learning classification, further broadening the capability of detecting and enforcing policies on sensitive image content, and apply the image classification and screenshot detection advances to the network traffic proxied in the cloud, in the context of the Netskope cloud access security broker (N-CASB), as described herein.

These disclosed innovations utilize machine learning classification, further broadening the capability of detecting and enforcing policies on sensitive image content.

An example system for detecting identification documents in images, referred to as image-borne identification documents, and protecting against loss of the image-borne identification documents in the cloud as well as for detecting screenshot images and protecting against loss of sensitive screenshot-borne data is described next.

Architecture

Figure 1B:
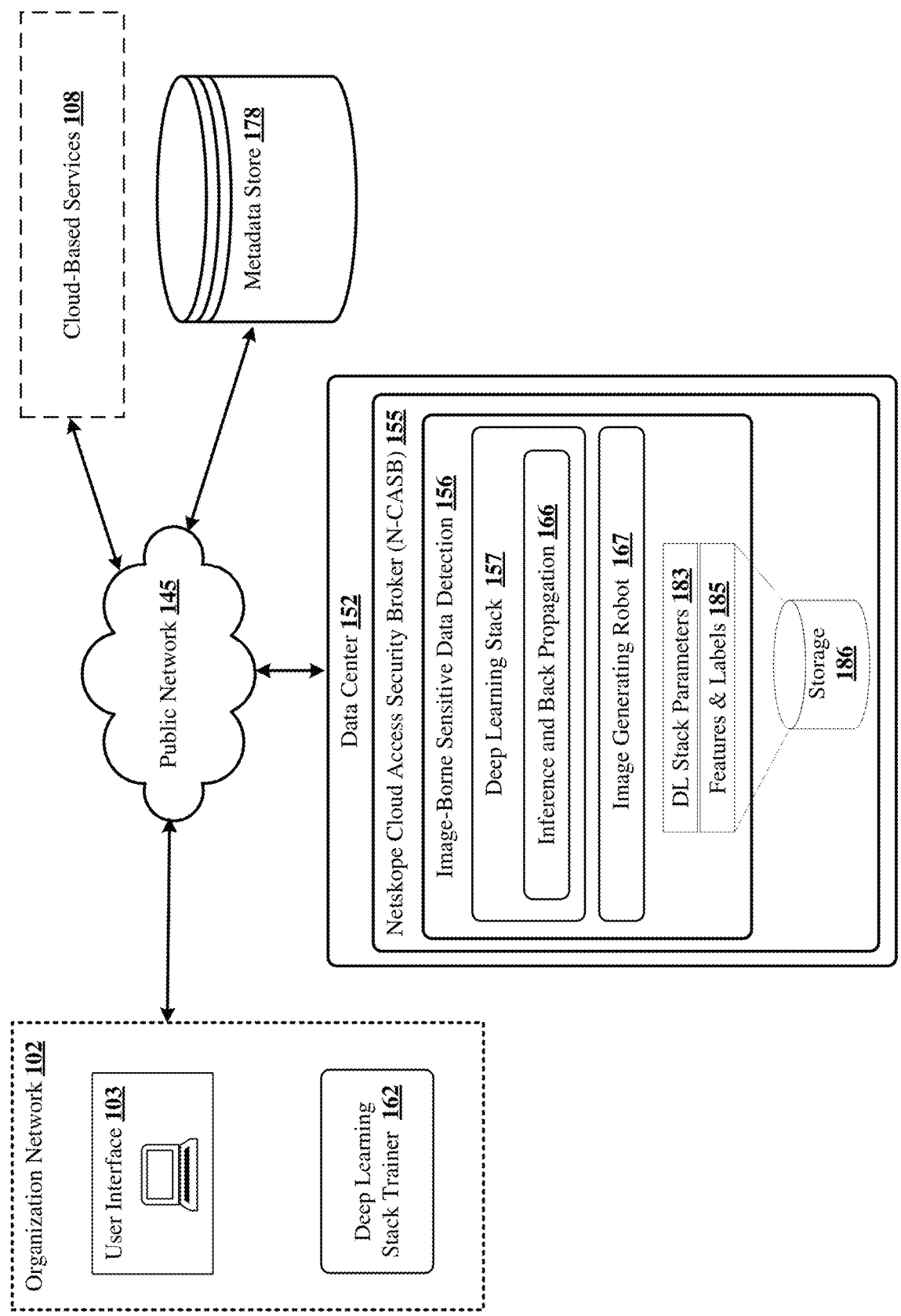
FIG. 1B illustrates image-borne sensitive data detection aspects of the architecture for detecting identification documents in images, referred to as image-borne identification documents, and protecting against loss of the image-borne identification documents, while applying security services in the cloud; and for detecting screenshot images and protecting against loss of sensitive screenshot-borne data.

FIG. 1A shows an architectural level schematic of a system 100 for detecting identification documents in images, referred to as image-borne identification documents, and protecting against loss of the image-borne identification documents in the cloud. System 100 can also detect screenshot images and protect against loss of sensitive screenshot-borne data. Because FIG. 1A is an architectural diagram, certain details are intentionally omitted to improve clarity of the description. The discussion of FIG. 1A will be organized as follows. First, the elements of the figure will be described, followed by their interconnections. Then, the use of the elements in the system will be described in greater detail. FIG. 1B illustrates image-borne sensitive data detection aspects of the system, and is described later.

System 100 includes organization network 102, data center 152 with Netskope cloud access security broker (N-CASB) 155 and cloud-based services 108. System 100 includes multiple organization networks 104 for multiple subscribers, also referred to as multi-tenant networks, of a security services provider and multiple data centers 154, which are sometimes referred to as branches. Organization network 102 includes computers 112a-n, tablets 122a-n, cell phones 132a-n and smart watches 142a-n. In another organization network, organization users may utilize additional devices. Cloud services 108 includes cloud-based hosting services 118, web email services 128, video, messaging and voice call services 138, streaming services 148, file transfer services 158, and cloud-based storage service 168. Data center 152 connects to organization network 102 and cloud-based services 108 via public network 145.

Continuing with the description of FIG. 1A, disclosed enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 utilizes machine learning classification for identity detection and sensitive screenshot detection, further broadening the capability of detecting and enforcing policies on sensitive image content to prevent data loss. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data.

Continuing further with the description of FIG. 1A, N-CASB 155 further includes monitor 184 that includes extraction engine 171, classification engine 172, security engine 173, management plane 174 and data plane 180. Also included in N-CASB 155, storage 186 includes deep learning stack parameters 183, features and labels 185, content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or userid corporate identity directory but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g. Microsoft's Active Directory. Such embodiments may allow policies to be defined in the directory, e.g. either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™, Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1A, system 100 can include any number of cloud-based services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™.

In the interconnection of the elements of system 100, network 145 couples computers 112a-n, tablets 122a-n, cell phones 132a-n, smart watches 142a-n, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1A, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used and one or more points of presence (POPs) can be established to implement the security functions. The engines or system components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112a-n, tablets 122a-n, cell phones 132a-n and smart watches 142a-n in organization network 102.

Computers 112a-n, tablets 122a-n, cell phones 132a-n and smart watches 142a-n in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g. a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g. read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. No. 9,398,102 (NSKO 1000-2); U.S. Pat. No. 9,270,765 (NSKO 1000-3); U.S. Pat. No. 9,928,377 (NSKO 1001-2); and U.S. patent application Ser. No. 15/368,246 (NSKO 1003-3); Cheng, Ithal, Narayanaswamy and Malmskog *Cloud Security For Dummies, Netskope Special Edition*, John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Active Platform*" by Netskope, Inc.; "*The Netskope Advantage: Three "Must-Have" Requirements for Cloud Access Security Brokers*" by Netskope, Inc.; "*The 15 Critical CASB Use Cases*" by Netskope, Inc.; "*Netskope Active Cloud DLP*" by Netskope, Inc.; "*Repave the Cloud-Data Breach Collision Course*" by Netskope, Inc.; and "*Netskope Cloud Confidence Index™*" by Netskope, Inc., which are incorporated by reference for all purposes as if fully set forth herein.

For system 100, a control plane 174 may be used along with or instead of management plane 174 and data plane 180. The specific division of functionality between these groups is an implementation choice. Similarly, the functionality can be highly distributed across a number of points of presence (POPs) to improve locality, performance, and/or security. In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

Initial deep learning models can perform well for the dataset used in training. For unseen images, the performance is unpredictable. There is an ongoing need to increase dataset coverage of real-world scenarios.

FIG. 1B illustrates image-borne sensitive data detection aspects of system 100, which is described relative to FIG. 1A earlier, with organization(s) network(s) 102, data center 152 and cloud-based services 108. Each distinct organization network 102 has user interface 103 for interacting with data loss prevention features and has deep learning stack trainer 162. A dedicated DL stack trainer is configurable to generate the respective updated DL stack for the organization, under the organization's control. This deep learning stack trainer 162 enables customer organizations to perform update training for their image and screenshot classifiers without the organization forwarding its sensitive data in images to a DLP provider that performed the pre-training of the master DL stack. This protects PII data and other sensitive data from being accessible at the data loss prevention provider, thus reducing requirements for protecting stored sensitive data stored at a DLP center. Training for the DL stack is described further later.

Continuing with the description of FIG. 1B, data center 152 includes Netskope cloud access security broker (N-CASB) 155 which includes image-borne sensitive data detection 156, with deep learning stack 157 with inference and back propagation 166, and image generating robot 167. Deep learning (DL) stack parameters 183 and features and labels 185 are saved in storage 186 which is described in detail earlier. Deep learning stack 157 utilizes saved features and labels 185 produced as output from the first set of layers of the stack and retained together with respective ground truth labels for progressive online deep learning, thereby eliminating any need to retain images of the private image-borne identification documents. As new image-borne identification documents are received, the new documents can be classified by the trained DL stack described later.

Image generating robot 167 produces examples of other image documents for use in training deep learning stack 157 in addition to real passport images and US driver license images. In one example, image generating robot 167 crawls US driver's license sample images via a web-based search engine, and inspects the images and filters out low fidelity images.

Image generating robot 167 also leverages tools usable for web UI automation to create synthetic data to train deep learning stack 157, collecting examples of the screenshot images and non-screenshot images and creating labelled ground-truth data for the examples, and applying re-rendering of at least some of the collected example screenshot images to represent different variations of screenshots that may contain sensitive information. One example tool is open source tool Selenium, which can open web browsers, visit websites, open documents and simulate clicking on the pages. For example, the tool can start with a plain desktop, then open one or multiple web browsers of different sizes in different locations of the desktop, and then visit live websites or open predefined local documents. These operations can then be repeated with randomized parameters, such as number of browser windows, browser window sizes and locations, relative positioning of the browser windows, etc. Then image generating robot 167 takes screenshots of the desktop and re-renders the screenshots, including augmenting the generated sample images as training data for feeding into DL stack 157. For example, this process can add noise to the images and enhance the robustness of DL stack 157. Augmentations applied to our training data include cropping parts of the image and adjusting hue, contrast and saturation. For detecting screenshot images that people use to exfiltrate data, no flipping or rotation has been added to the image augmentations. For a different example implementation, flipping and rotation could be added to the examples of other image documents.

FIG. 2 shows a block diagram for deep learning (DL) stack 157 implemented using a convolutional neural network (CNN) architecture model for image classification configurable for use in a system for detecting identification documents in images and detecting screenshot images. The CNN architecture model image was downloaded from https://towardsdatascience.com/covolutional-neural-network-cb0883dd6529 on Apr. 28, 2020. Input to the initial CNN layer is the image data itself, represented in a three dimensional matrix with the image dimension and three color channels: red, green and blue. The input image can be 224×224×3, as depicted in FIG. 2. In another implementation, the input image can be 200×200×3. In the example implementation for which results are illustrated later, the image size utilized is 160×160×3 with a total of 88 layers.

Continuing the description of DL stack 157, the feature extraction layers are convolution layers 245 and pooling layers 255. The disclosed system stores the features and labels 185 output of the feature extraction layers as numeric values that have been processed through many different iterations of convolution operations, saving non-invertible features instead of raw images. The extracted features cannot be inverted to the original image pixel data. That is, the stored features are non-invertible features. By storing these extracted features instead of the input image data, the DL stack does not store the original image pixels which can carry sensitive and private information such as Personally Identifiable Information (PII), Protected Health Information (PHI) and Intellectual Property (IP).

DL stack 157 includes a first set of layers closer to an input layer and a second set of layers further from the input layer. The first set of layers gets pre-trained to perform image recognition before exposing the second set of layers of the DL stack to the labelled ground truth data for the image-borne identification documents and examples of other image documents. The disclosed DL stack 157 freezes the first fifty layers as a first set of layers. DL stack 157 is trained by forward inference and back propagation 166 using labelled ground truth data for the image-borne identification documents and examples of other image documents. For private image-borne identification documents and for screenshot images, the CNN architecture model captures features produced as output from the first set of layers and retains the captured features together with respective ground truth labels, thereby eliminating any need to retain images of the private image-borne identification documents. Fully connected layers 265 and SoftMax layers 275 comprise a second set of layers further from the input layer of the CNN which is trained and, together with the first set of layers the model is utilized to detect identification documents in images and detect screenshot images.

Training of DL stack 157 with forward inference and back propagation 166 utilizes labelled ground truth data for the image-borne identification documents and examples of other image documents. The first set of layers gets pre-trained to perform image recognition before exposing the second set of layers of the DL stack to the labelled ground truth data for the image-borne identification documents and examples of other image documents. The output of the image classifier can be leveraged for training the second set of layers, in one example feeding only images classified as the same type by both OCR and the image classifier to the deep learning stack as labeled images.

The disclosed technology stores parameters of the trained DL stack 183 for inference from production images, and uses a production DL stack with the stored parameters to classify production images by inference as containing a sensitive image-borne identification document in one use case or a screenshot image in another case.

In one use case, the objective was to develop an image classification deep learning model to detect passport images. Initial training data for building a deep learning based binary image classifier to classify passports was generated using about 550 passports from 55 countries as labelled ground truth data for detecting image-borne identification documents. Since the goal was to detect passports with a high detection rate, it was not acceptable to detect other ID types as passports. Other ID type images and non-ID images including driver's licenses, identification cards, student IDs, Army IDs, etc. were used as the negative dataset. These other ID images were used in the negative dataset to satisfy the goal of minimizing the detection rate on other ID types.

In a second use case, the objective was to develop an image classifier to detect passport images and US driver license images. Training data for building a deep learning based binary image classifier to classify passports was generated using 550 passport images and 248 US driver license images. In addition to the real passport images and US driver license images, US driver license sample images obtained by crawling the Internet were included after inspection and filtering out of low fidelity images.

Cross-validation techniques were used for evaluating the DL stack models, by training several models on subsets of the available input data and evaluating them on the complementary subset of the data. In k-fold cross-validation, the input data gets split into k subsets of data, also known as folds. 10-fold cross validation was applied to check the performance of the resulting image classifier. Precision and recall of the model were checked, selecting 0.3 as cutoff for US driver licenses and 0.8 as the cutoff for passports.

Figure 3:
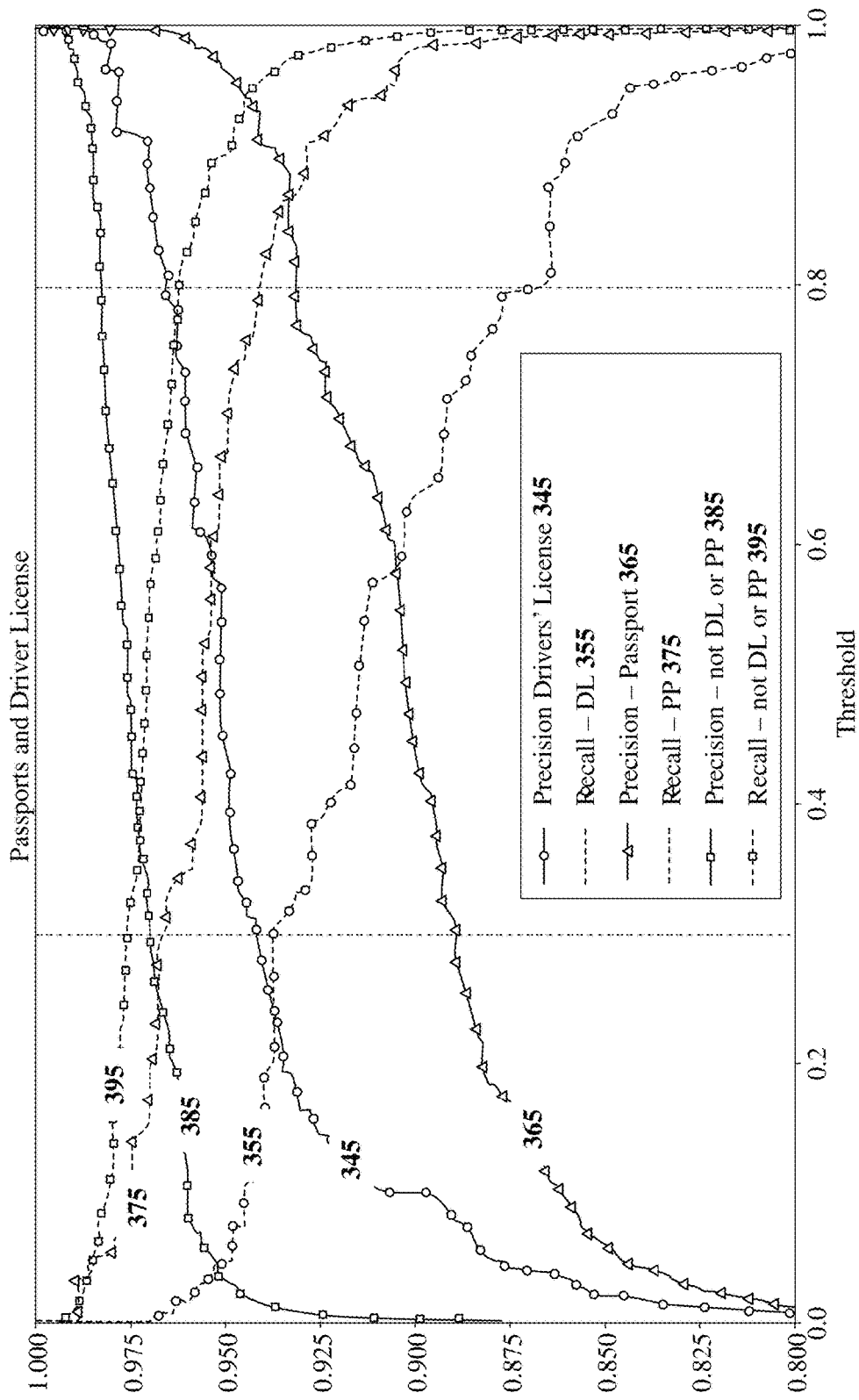
FIG. 3 shows precision and recall results for the trained passport and driver's license classifier.

FIG. 3 shows precision and recall results graphed for the trained passport and driver's license classifier, with precision for drivers' licenses 345 and recall for driver's licenses 355, precision for passports 365 and recall for passport images 375, and precision for non-ID (non-driver's license or passport) aka negative results 385 and recall for negative results 395. As precision increases, the recall decreases, as shown by the graph. Designers applied 10-fold cross validation to check the performance of the passport image classifier. False positive rate (FPR) was calculated on the non-ID images in testing, and false negative rate (FNR) was calculated on the passport and driver's license images in testing. The results of the 10 fold cross validation were averaged, and the averaged FPR and FNR are listed next.

FPR on passports (non-ID images are classified as passports): 0.7%
FPR on US driver's licenses (non-ID images are classified as US driver's licenses): 0.3%
FNR on passports (passport images are not classified as passports): 6%
FNR on US driver's licenses (US driver's license images are not classified as driver's licenses): 6%

Figures 4, 5:
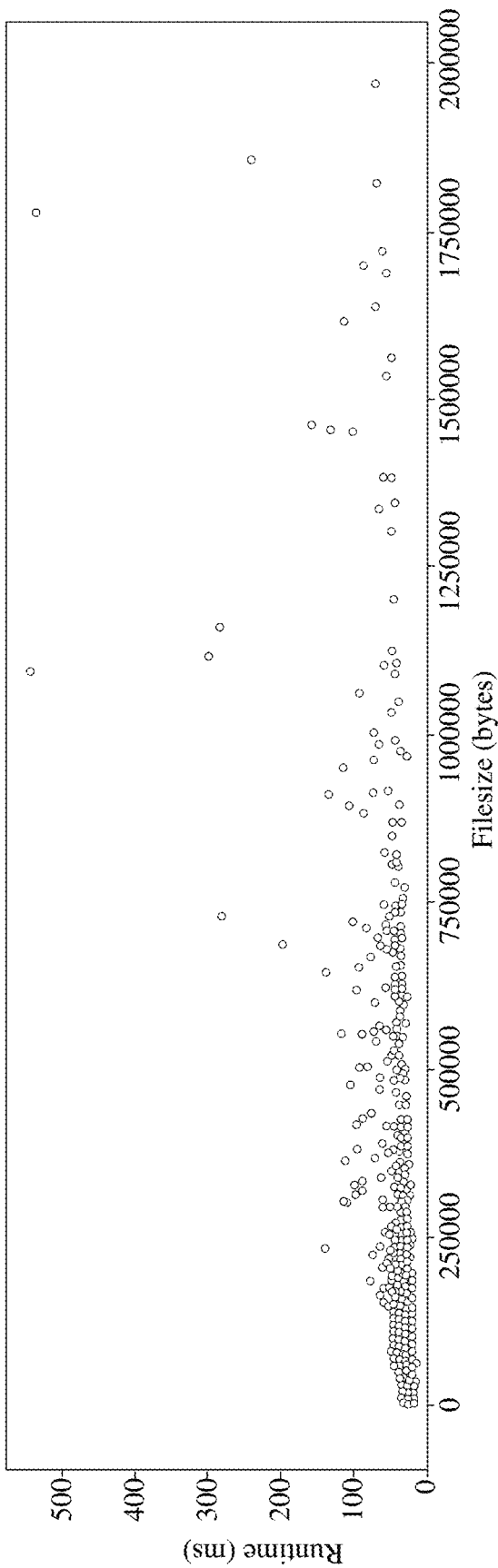
FIG. 4 illustrates runtime results for classifying images, graphed as a distribution for the images.
FIG. 5 shows benchmarking results for classifying sensitive images with US drivers' licenses.

FIG. 4 illustrates runtime results for classifying images, graphed as a distribution for the images, testing using the model inference on Google Cloud Platform (GCP) (n1-highcpu-64: 64 vCPUs, 57.6 GB memory) using 1000+ images with different file sizes. The graph shows the runtime distribution for the images as a function of file size, for images with a file size less than or equal to 2 MB. The runtime was counted from the time 'opencv' read the image to the time when the classifier finished making its prediction on the image. The runtime was found to have a mean value of 45 ms and standard deviation of 56 ms.

FIG. 5 shows benchmarking results comparing a commercially available classifier to the vastly improved performance of the disclosed deep learning stack for classifying sensitive images with US drivers' licenses. The number of images being classified is 334. Using a commercially available classifier that uses OCR and pattern matching via regular expression (Regex), the number of images detected, of the 334 images, is 238, which represents 71.2% detection 566. The majority of sensitive images are detected and the systems works only "reasonably" well. For some images, the classifier fails to extract text which is blurry or rotated. By contrast, the disclosed technology utilizing the deep learning stack detects 329 of the 334 images, which represents 98.5% detection 576 of images containing a sensitive image-borne identification document.

Figure 6:
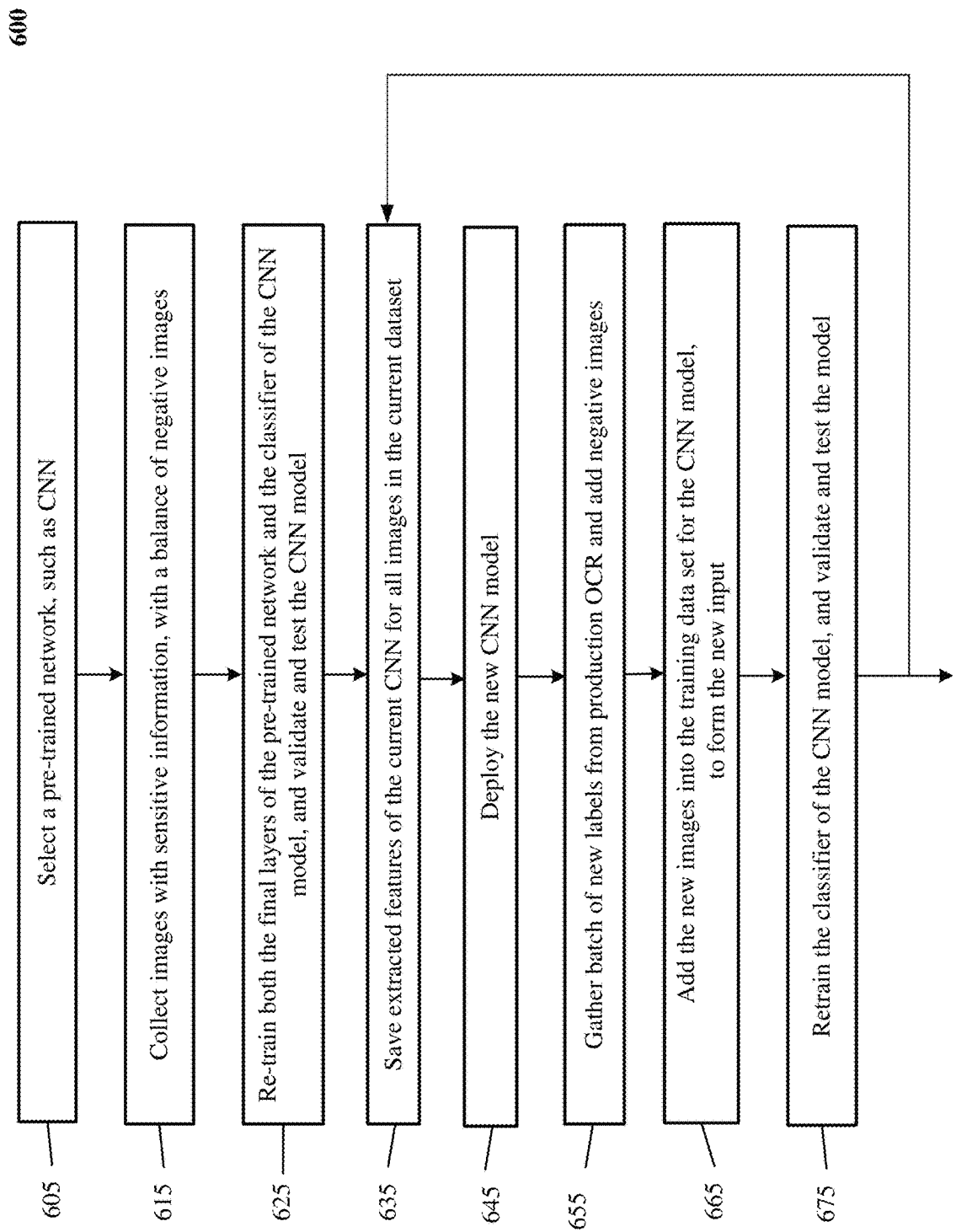
FIG. 6 shows an example workflow for training a deep learning stack for detecting identification documents in images, referred to as image-borne identification documents, and protecting against loss of the image-borne identification documents.

FIG. 6 shows an example workflow 600 for detecting identification documents in images, referred to as image-borne identification documents, and protecting against loss of the image-borne identification documents. In step 605, select a pre-trained network, such as the CNN described relative to FIG. 2 earlier. DL stack includes at least a first set of layers closer to an input layer and a second set of layers further from the input layer, with the first set of layers being pre-trained to perform image recognition. In the described example a MobileNet CNN for detecting images was selected. A different CNN or even a different ML classifier can be selected. Step 615 covers collecting images with sensitive information with a balance of negative images, as described for two use cases. At step 625, re-train both the final layers of the pre-trained network and the classifier of the CNN model and validate and test the CNN model—training the DL stack by forward inference and back propagation using the labelled ground truth data for the image-borne identification documents and examples of other image documents collected in step 615, exposing the second set of layers of the DL stack to the labelled ground truth data for the image-borne identification documents and examples of other image documents. At step 635, save extracted features of the current CNN for all images in the current dataset. At step 645, deploy the new CNN model, a production DL stack with the stored parameters of the trained DL stack for inference from production images. At step 655 gather a batch of new labels from production OCR and add negative images that do not include image-borne information. At step 665, add the new images into the training data set for the CNN model, to form the new input. At step 675, retrain the classifier of the CNN model, and validate and test the model before using the production DL stack to classify at least one production image by inference as containing a sensitive image-borne identification document.

For the use case of detecting screenshot images and protecting against loss of sensitive screenshot-borne data, the workflow is similar to workflow 600. For the detecting screenshot images scenario, image generating robot 167 is a screenshot robot that collects examples of screenshot images and non-screenshot images and creates labelled ground-truth data for the examples, without the need for OCR, for use in training deep learning stack 157. The screenshot robot applies re-rendering of at least some of the collected example screenshot images to represent variations of screenshots that may contain sensitive information. The training data for training the DL stack by forward inference and back propagation using labelled ground truth data utilizes the screenshot images and examples of non-screenshot images. In one example, full screenshot images include a single application window, with the window size covering more than 50% of the full screen. For another example, full screenshot images show multiple application windows and in yet another example, an application screenshot image displays a single application window.

FIG. 7 illustrates an example screenshot image that includes a customer's inventory list with costs listed. By detecting the screenshot image, exfiltration of sensitive company data can be thwarted.

Cross validation of the results obtained using the disclosed method for detecting screenshot images focused on checking how well the DL stack model generalizes. Collected examples of screenshot images and non-screenshot images were separated into training and testing sets, for the screenshot images with a MAC background. The images that included a Windows background and those that included a Linux background were used exclusively for testing. In addition, the application windows were split into training and testing sets based on their categories. Performance for five distinct cross validation cases are described next. The union of training data was a set of synthetic full screenshots blended by training MAC background and training App windows.

For cross validation case one, the testing data was a set of synthetic full screenshots blended by testing on MAC background and testing on App windows. The accuracy for detecting screenshots was measured as 93%. For cross validation case two, the testing data was a set of synthetic full screenshots blended by testing on Windows background and testing App windows. The accuracy for detecting screenshots was measured as 92%. For cross validation case three, the testing data was a set of synthetic full screenshots blended by testing on Linux background and testing App windows. The accuracy for detecting screenshots was measured as 86%. For cross validation case four, the testing data was a set of synthetic full screenshots blended by on testing MAC background and testing multiple App windows. The accuracy for detecting screenshots using these training and test data sets was measured as 97%. For cross validation case five, the testing data was testing different apps than the training app windows and the accuracy was measured as 84%.

Figure 8B:
FIG. 8A, FIG. 8B, FIG. 8C and FIG. 8D depict four false positive screenshot images.
Figure 8D:
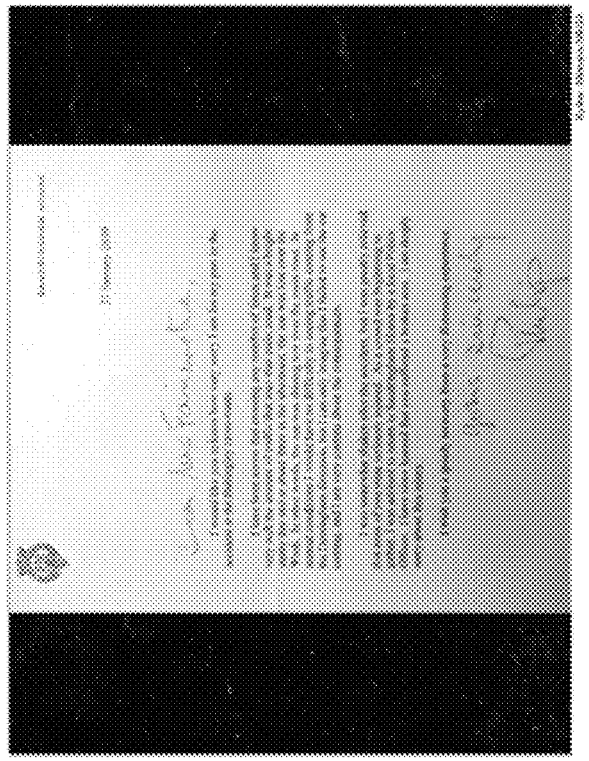
Figure 8A:
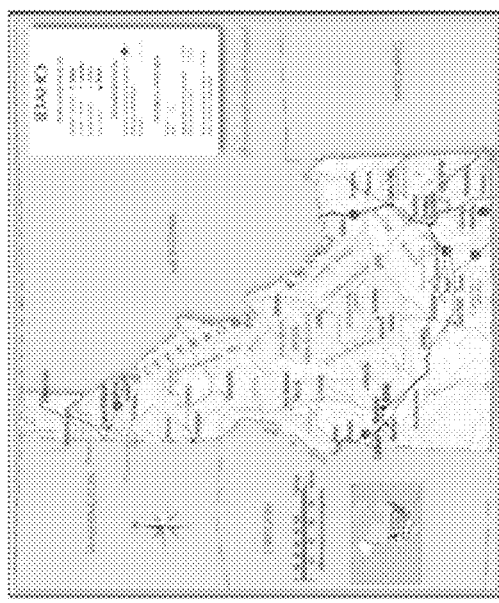
Figure 8C:
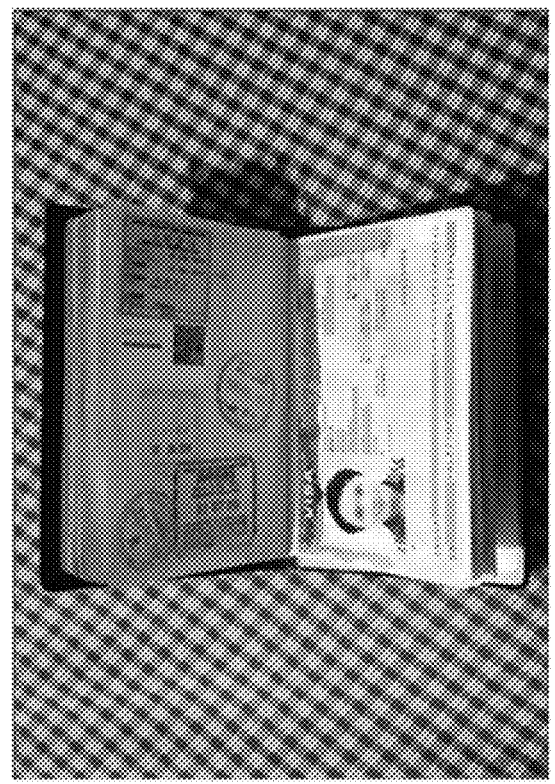

The performance of the deep learning stack model was tested for the unseen type of background and app windows, and then with synthetic full screenshots with all the background images and all the app windows, using 4,528 screenshots plus 1,964 non-screenshot images to train the classifier. Testing of the classifier was with 45,179 images. The false negative rate (FNR) test with 45,179 screenshots, resulted in 90 images classified as false negatives (FN) for FNR of 0.2% with threshold of 0.7. For the false positive rate (FPR) test, of 1,336 non-screenshot images, four were classified as false positives (FP) for FPR of 0.374% with threshold of 0.7. The four images in the test sets were misclassified as screenshots when they were non-screenshot images. Many layers in the disclosed deep learning stack model work to capture the features to determine "screenshot", including the following prominent features. (1) Screenshots tend to contain one or more major window(s) that contain sensitive information. Such information can be personal information, code, text, pictures, etc. (2) Screenshots tend to contain header/footer bars, such as menu or application bars. (3) Screenshots tend to have a contrast or uniform background compared to the content in application windows. For the four FP images, the major reasons that the images were classified as screenshots are listed next. FIG. 8A shows the Idaho map, which was misclassified as a screenshot image due to the legend window and the dotted lines on the top and bottom. FIG. 8B shows a driver license image which was misclassified as a screenshot image because the whole image is a window containing PII in a black background and the UNITED STATES bar may be treated as a header bar. FIG. 8C shows a passport image, as a major window that contains PII and the shadowed part on the middle bottom may mislead the classifier to think it is an application bar. FIG. 8D shows a letter in a major window that contains text information and a uniform background, which was misclassified as a screenshot image.

In some use cases, distinct organizations that require DLP services can utilize locally-operated dedicated DL stack trainers 162 configured to combine non-invertible features from the examples of the organization sensitive data in images with ground truth labels for the examples. The dedicated DL stack trainers forward the non-invertible features and ground truth labels to deep learning stack 157 that receives from the dedicated DL stack trainers 162, organization-sensitive training examples including the non-invertible features and ground truth labels. The organization-sensitive training examples are used to further train the second set of layers of the trained master DL stack. Updated parameters of the second set of layers for inference from production images are stored and can be distributed to multiple distinct organizations with no compromise of data security, as sensitive data is not accessible in the non-invertible features.

Training of deep learning stack 157 can commence from scratch, utilizing the training examples in a different order. Alternatively, in another instance, the training can further train the second set of layers of the trained master DL stack, using an added batch of labeled example images.

In the added batch scenario, when samples are received back from customer organizations, the dedicated DL stack trainers can be configured to forward updated coefficients from the second set of layers. Deep learning stack 157 can receive from multiple dedicated DL stack trainers respective updated coefficients from respective second sets of layers and can combine the updated coefficients from respective second sets of layers to train the second set of layers of the trained master DL stack. Deep learning stack 157 can then store updated parameters of the second set of layers of the trained master DL stack for inference from production images and distribute the updated parameters of the second set of layers to the distinct customer organizations.

Dedicated DL stack trainers 162 can handle training for detecting image-borne identification documents in one example, and can handle training for detecting screenshot images in another example.

Next, we describe an example computer system useable for detecting identification documents in images, detecting screenshots and protecting against loss of sensitive image-borne documents in the cloud.

Computer System

Figure 9:
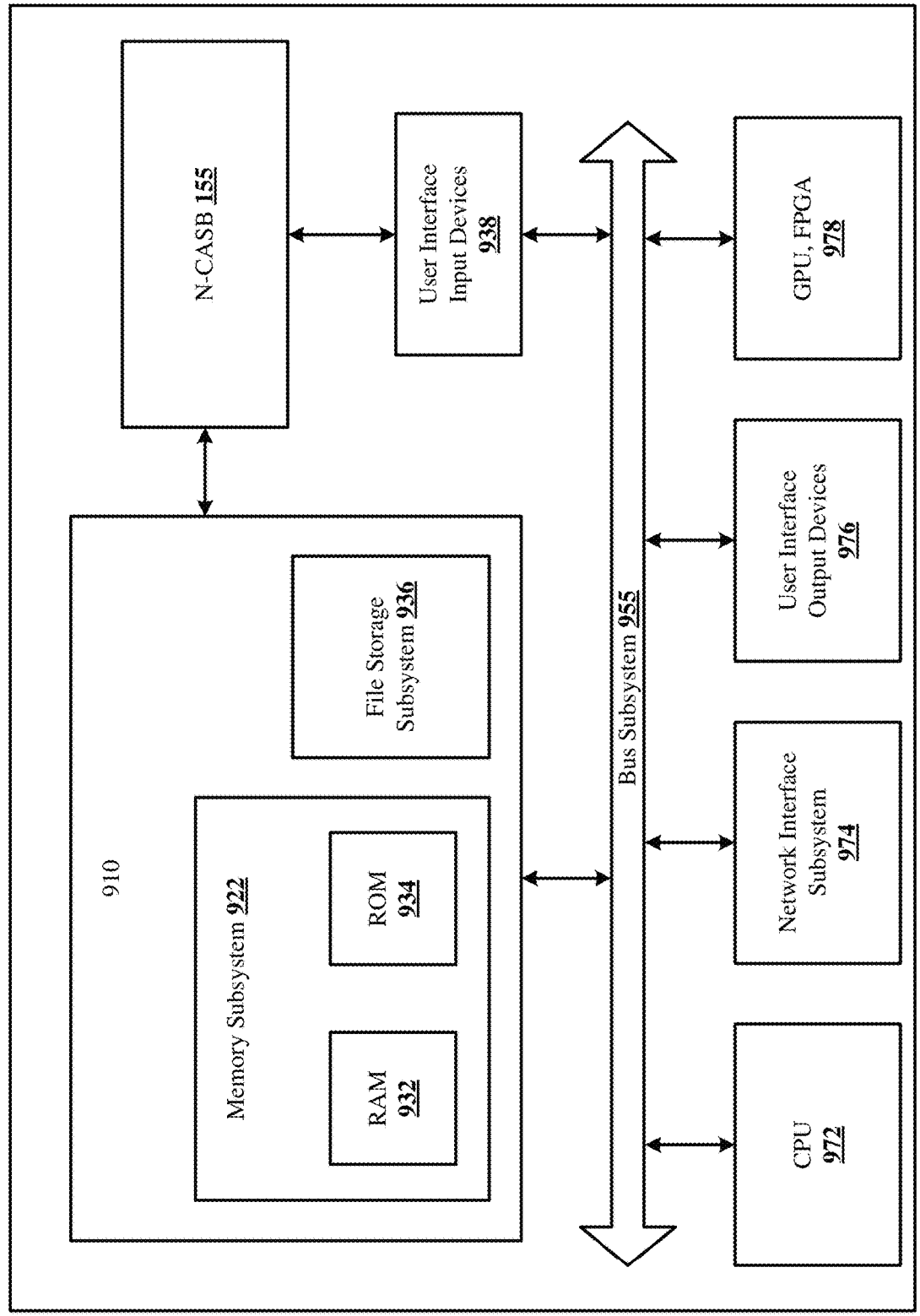
FIG. 9 is a simplified block diagram of a computer system that can be used to implement detecting of identification documents in images and protecting against loss of the image-borne identification documents, and can be used for detecting screenshot images and protecting against loss of the image-borne screenshot according to one embodiment of the disclosed technology.

FIG. 9 is a simplified block diagram of a computer system 900 that can be used for detecting identification documents in images, referred to as image-borne identification documents, and protecting against loss of the image-borne identification documents in the cloud. Computer system 900 is also usable for detecting screenshot images and protecting against loss of sensitive screenshot-borne data. Additionally, computer system 900 is usable for customizing a deep learning stack to detect organization sensitive data in images and protecting against loss of the image-borne organization sensitive documents without requiring transfer of the potentially sensitive images to a centralized DLP service. Computer system 900 includes at least one central processing unit (CPU) 972 that communicates with a number of peripheral devices via bus subsystem 955, and Netskope cloud access security broker (N-CASB) 155 for providing network security services described herein. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems.

In one implementation, Netskope cloud access security broker (N-CASB) 155 of FIG. 1A and FIG. 1B is communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. Subsystem 978 can be graphics processing units (GPUs) or field-programmable gate arrays (FPGAs).

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

Figure 10:
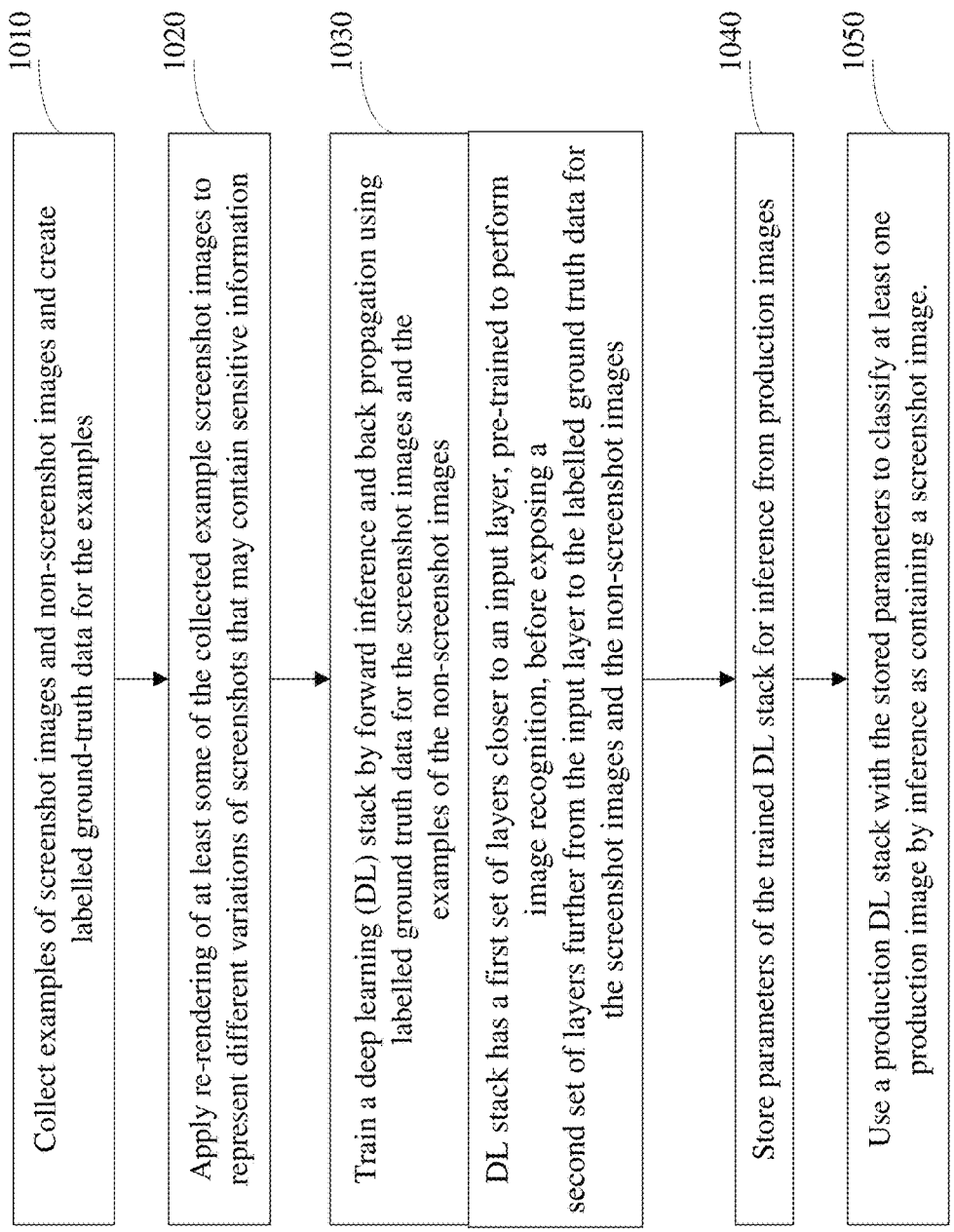
FIG. 10 shows an example workflow for training a deep learning stack for detecting identification documents in images, referred to as image-borne identification documents, and protecting against loss of the image-borne identification documents.

FIG. 10 shows a workflow 1000 for a system of one or more computers that can be configured to detect screenshot images and protect against loss of screenshot data. The computers perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Multiple actions can be combined in some implementations. For convenience, this flowchart is described with reference to a system which includes Netskope cloud access security broker (N-CASB) and load balancing in a dynamic service chain while applying security services in the cloud. One general aspect includes a method of detecting screenshot images and protecting against loss of sensitive screenshot-borne data, including collecting examples of the screenshot images and non-screenshot images and creating labelled ground-truth data for the examples 1010. The method of detecting screenshot images also includes applying re-rendering of at least some of the collected example screenshot images to represent different variations of screenshots that may contain sensitive information 1020. The method of detecting screenshot images also includes training a deep learning (DL) stack by forward inference and back propagation using labelled ground truth data for the screenshot images and the examples of the non-screenshot images 1030. DL stack has a first set of layers closer to an input layer, pre-trained to perform image recognition, before exposing a second set of layers further from the input layer to the labelled ground truth data for the screenshot images and the non-screenshot images. The method of detecting screenshot images also includes storing parameters of the trained DL stack for inference from production images 1040. The method of detecting screenshot images also includes using a production DL stack with the stored parameters to classify at least one production image by inference as containing a screenshot image 1050. Other embodiments of this aspect include corresponding computer systems, apparatus, and computer programs recorded on one or more computer storage devices, each configured to perform the actions of the methods.

Particular Implementations

Some particular implementations and features for detecting identification documents in images and protecting against loss of the image-borne identification documents are described in the following discussion.

In one disclosed implementation, a method of detecting identification documents in images, referred to as image-borne identification documents, and protecting against loss of the image-borne identification documents, includes training a deep learning (DL) stack by forward inference and back propagation using labelled ground truth data for the image-borne identification documents and the examples of other image documents. The disclosed DL stack includes at least a first set of layers closer to an input layer and a second set of layers further from the input layer, and further includes the first set of layers being pre-trained to perform image recognition before exposing the second layer of the DL stack to the labelled ground truth data for the image-borne identification documents and the examples of other image documents. The disclosed method also includes storing parameters of the trained DL stack for inference from production images and using a production DL stack with the stored parameters to classify at least one production image by inference as containing a sensitive image-borne identification document.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some disclosed implementations of the method optionally include, for private image-borne identification documents, capturing features produced as output from the first set of layers and retaining the captured features together with respective ground truth labels, thereby eliminating any need to retain images of the private image-borne identification documents.

Some implementations of the disclosed method include restricting training by backward propagation using the labelled ground truth data for the image-borne identification documents and the examples of other image documents to training of parameters in the second set of layers.

For one disclosed implementation of the method, optical character recognition (OCR) analysis of images is applied to label the images as identification documents or non-identification documents. Highly confident classifications can be selected after the OCR analysis, for use in the training set. OCR and regular expression matching serve as an automated way of generating labelled data from a customer's production images. In one example, for US passports, OCR first extracts the text on the passport page. Then regular expressions can match "PASSPORT", "UNITED STATES", "Department of State", "USA", "Authority", and other words on the page. In a second example, for California driver's licenses, OCR first extracts the text on the front of the driver's license. Then regular expressions can match "California", "USA", "DRIVER LICENSE", "CLASS", "SEX", "HAIR", "EYES" and other words on the front page. In a third example, for Canadian passports, OCR first extracts the text on the passport page. Then regular expressions can match "PASSPORT", "PASSEPORT", "CANADA" and other words on the page.

For some disclosed implementations of the method, a first set of the image-borne identification documents is distorted in perspective to produce a second set of the image-borne identification documents and combining the first and second sets with the labelled ground truth data when training the DL stack by back-propagation.

For other disclosed implementations of the method, a first set of the image-borne identification documents is distorted by rotation to produce a third set of the image-borne identification documents and combining the first and third sets with the labelled ground truth data when training the DL stack by back-propagation.

For one disclosed implementation of the method, a first set of the image-borne identification documents is distorted by noise to produce a fourth set of the image-borne identification documents and combining the first and fourth sets with the labelled ground truth data when training the DL stack by back-propagation.

For some disclosed implementations of the method, a first set of the image-borne identification documents is distorted in focus to produce a fifth set of the image-borne identification documents and combining the first and fifth sets with the labelled ground truth data when training the DL stack by back-propagation.

In some implementations, the disclosed method includes storing non-invertible DL features of the current training ground-truth images, but not the original ground-truth images, to avoid saving sensitive personal information, and includes regularly adding non-invertible DL features of new ground-truth images to augment the training set, and regularly re-training the augmented training data set for better accuracy. The non-invertible DL features cannot be transformed into images with recognizable sensitive data.

Some particular implementations and features for detecting screenshot images and protecting against loss of sensitive screenshot-borne data are described in the following discussion.

In one disclosed implementation, a method of detecting screenshot images and protecting against loss of sensitive screenshot-borne data includes collecting examples of the screenshot images and non-screenshot images and creating labelled ground-truth data for the examples. The method also includes applying re-rendering of at least some of the collected example screenshot images to represent different variations of screenshots that may contain sensitive information, and training a DL stack by forward inference and back propagation using labelled ground truth data for the screenshot images and the examples of the non-screenshot images. The method further includes storing parameters of the trained DL stack for inference from production images and using a production DL stack with the stored parameters to classify at least one production image by inference as containing a sensitive image-borne screenshot.

Some implementations of the disclosed method further include applying a screenshot robot to collect the examples of the screenshot images and non-screenshot images.

In one implementation of the disclosed method, the DL stack includes at least a first set of layers closer to an input layer and a second set of layers further from the input layer, further including the first set of layers being pre-trained to perform image recognition before exposing the second layer of the DL stack to the labelled ground truth data for the screenshot images and the examples of the non-screenshot images.

Some implementations of the disclosed method include applying automated re-rendering of at least some of the collected original screenshot images by cropping parts of the image or adjusting hue, contrast and saturation to represent the variations of screenshots. In some cases, the different variations of screenshots include at least one of window size, window location, number of open windows and menu bar position.

In one implementation of the disclosed method, a first set of the screenshot images is framed with varying photographic image borders of more than one sensitive image-borne screenshot to produce a third set of the screenshot images and combining the first and third sets with the labelled ground truth data when training the DL stack by back propagation. In another implementation, a first set of the screenshot images is framed with multiple, overlaid program window borders of more than one sensitive image-borne screenshot to produce a fourth set of the screenshot images and combining the first and fourth sets with the labelled ground truth data when training the DL stack by back propagation.

Some particular implementations and features for detecting organization sensitive screenshot images and protecting against loss of the image-borne organization sensitive screenshots are described in the following discussion.

In one disclosed implementation, a method of customizing a deep learning stack to detect organization sensitive data in images, referred to as image-borne organization sensitive documents, and protecting against loss of the image-borne organization sensitive documents, includes pre-training a master DL stack by forward inference and back propagation using labelled ground truth data for image-borne sensitive documents and examples of other image documents. The DL stack includes at least a first set of layers closer to an input layer and a second set of layers further from the input layer, further including the first set of layers being pre-trained to perform image recognition before exposing the second set of layers of the DL stack to the labelled ground truth data for the image-borne sensitive documents and examples of other image documents. The disclosed method also includes storing parameters of the trained master DL stack for inference from production images, distributing the trained master DL stack with the stored parameters to a plurality of organizations, and permitting the organizations to perform update training of the trained master DL stack using at least examples of the organization sensitive data in images and to save parameters of the updated DL stacks. The organizations use respective updated DL stacks to classify at least one production image by inference as including an organization sensitive document, Training of a deep learning stack can commence from scratch, in one case, and in another implementation the training can further train the second set of layers of the trained master DL stack, using an added batch of labeled example images utilized with the previously determined coefficients. Some implementations of the disclosed method further include providing at least some of the organization with a dedicated DL stack trainer, under the organization's control, and allowing the organization to perform the update training without the organization forwarding its examples of the organization sensitive data in images to a provider that performed the pre-training of the master DL stack. The dedicated DL stack trainer is configurable to generate the respective updated DL stack. Some cases also include the dedicated DL stack trainers configured to combine non-invertible features from the examples of the organization sensitive data in images with ground truth labels for the examples and to forward the non-invertible features and ground truth labels, and receiving from a plurality of the dedicated DL stack trainers organization-sensitive training examples including the non-invertible features and ground truth labels. In some implementations, the disclosed method also includes using the organization-sensitive training examples to further train the second set of layers of the trained master DL stack, storing updated parameters of the second set of layers for inference from production images and distributing the updated parameters of the second set of layers to the plurality of organizations. Some implementations further include performing update training to further train the second set of layers of the trained master DL stack. In other cases, the method includes performing from-scratch training, with the organization-sensitive training examples in a different order, to further train the second set of layers of the trained master DL stack. For one implementation, the disclosed method further includes the dedicated DL stack trainers configured to forward updated coefficients from the second set of layers, receiving from a plurality of the dedicated DL stack trainers respective updated coefficients from respective second sets of layers and combining the updated coefficients from respective second sets of layers to train the second set of layers of the trained master DL stack. The disclosed method also includes storing updated parameters of the second set of layers of the trained master DL stack for inference from production images and distributing the updated parameters of the second set of layers to the plurality of organizations.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A method of detecting screenshot images and protecting against loss of sensitive screenshot-borne data, including:
    collecting examples of the screenshot images and non-screenshot images and creating labelled ground-truth data for the examples;
    applying re-rendering of at least some of the collected example screenshot images to represent different variations of screenshots that may contain sensitive information;
    training a deep learning (abbreviated DL) stack by forward inference and back propagation using labelled ground-truth data for the screenshot images and the examples of the non-screenshot images; and
    using results of the back propagation to configure parameters of the trained DL stack for inference from images in production.

2. The method of claim 1, further including applying a screenshot robot to collect the examples of the screenshot images and non-screenshot images.

3. The method of claim 1, wherein the DL stack includes at least a first set of layers closer to an input layer and a second set of layers further from the input layer, further including the first set of layers being pre-trained to perform image recognition before exposing the second set of layers of the DL stack to the labelled ground-truth data for the screenshot images and the examples of the non-screenshot images.

4. The method of claim 1, further including applying automated re-rendering of at least some of the collected screenshot images by cropping parts of an image or adjusting hue, contrast and saturation to represent the different variations of screenshots.

5. The method of claim 1, wherein the different variations of screenshots include at least one of window size, window location, number of open windows and menu bar position.

6. The method of claim 1, wherein a first set of the screenshot images is framed with varying photographic image borders of more than one image-borne screenshot to produce a third set of the screenshot images and combining the first and third sets of the screenshot images with the labelled ground-truth data when training the DL stack by back propagation.

7. The method of claim 1, wherein a first set of the screenshot images is framed with multiple, overlaid program window borders of more than one image-borne screenshot to produce a fourth set of the screenshot images and combining the first and fourth sets of the screenshot images with the labelled ground-truth data when training the DL stack by back propagation.

8. A tangible non-transitory computer readable storage media, including program instructions loaded into memory that, when executed on processors, cause the processors to implement a method of detecting screenshot images and protecting against loss of at least one image-borne screenshot, the method including:
  collecting examples of the screenshot images and non-screenshot images and creating labelled ground-truth data for the examples;
  applying re-rendering of at least some of the collected example screenshot images to represent different variations of screenshots that may contain sensitive information;
  training a deep learning (abbreviated DL) stack by forward inference and back propagation using labelled ground truth data for the screenshot images and the examples of the non-screenshot images; and
  using results of the back propagation to configure parameters of the trained DL stack for inference from images in production.

9. The tangible non-transitory computer readable storage media of claim 8, further including applying a screenshot robot to collect the examples of the screenshot images and non-screenshot images.

10. The tangible non-transitory computer readable storage media of claim 8, wherein the DL stack includes at least a first set of layers closer to an input layer and a second set of layers further from the input layer, further including the first set of layers being pre-trained to perform image recognition before exposing the second set of layers of the DL stack to the labelled ground-truth data for the screenshot images and the examples of the non-screenshot images.

11. The tangible non-transitory computer readable storage media of claim 8, further including applying automated re-rendering of at least some of the collected screenshot images by cropping parts of an image or adjusting hue, contrast and saturation to represent the different variations of screenshots.

12. The tangible non-transitory computer readable storage media of claim 8, wherein the different variations of screenshots include at least one of window size, window location, number of open windows and menu bar position.

13. The tangible non-transitory computer readable storage media of claim 8, wherein a first set of the screenshot images is framed with varying photographic image borders of more than one image-borne screenshot to produce a third set of the screenshot images and combining the first and third sets of the screenshot images with the labelled ground-truth data when training the DL stack by back propagation.

14. The tangible non-transitory computer readable storage media of claim 8, wherein a first set of the screenshot images is framed with multiple, overlaid program window borders of more than one image-borne screenshot to produce a fourth set of the screenshot images and combining the first and fourth sets of the screenshot images with the labelled ground-truth data when training the DL stack by back propagation.

15. A system for detecting screenshot images and protecting against loss of the image-borne screenshot, the system including a processor, memory coupled to the processor, and computer instructions from the non-transitory computer readable storage media of claim 8 loaded into the memory.

16. The system of claim 15, further including applying a screenshot robot to collect the examples of the screenshot images and non-screenshot images.

17. The system of claim 15, wherein the DL stack includes at least a first set of layers closer to an input layer and a second set of layers further from the input layer, further including the first set of layers being pre-trained to perform image recognition before exposing the second set of layers of the DL stack to the labelled ground-truth data for the screenshot images and the examples of the non-screenshot images.

18. The system of claim 15, further including applying automated re-rendering of at least some of the collected screenshot images by cropping parts of an image or adjusting hue, contrast and saturation to represent the different variations of screenshots.

19. The system of claim 15, wherein the different variations of screenshots include at least one of window size, window location, number of open windows and menu bar position.

20. The system of claim 15, wherein a first set of the screenshot images is framed with varying photographic image borders of more than one image-borne screenshot to produce a third set of the screenshot images and combining the first and third sets of the screenshot images with the labelled ground-truth data when training the DL stack by back propagation.

* * * * *